United States Patent [19]
Cronin

[11] Patent Number: 6,076,300
[45] Date of Patent: Jun. 20, 2000

[54] ROOT FEEDING STAKE

[76] Inventor: Raymond M. Cronin, 2608 Aktia Pl., Holiday, Fla. 34691

[21] Appl. No.: 09/196,444

[22] Filed: Nov. 19, 1998

[51] Int. Cl.$^7$ .................................................... A01G 9/10
[52] U.S. Cl. ............................................................ 47/48.5
[58] Field of Search ................................ 47/48.5, 43, 44, 47/47; 111/92

[56]         References Cited

U.S. PATENT DOCUMENTS

| 762,589 | 6/1904 | Lawrence | 47/48.5 |
|---|---|---|---|
| 4,361,983 | 12/1982 | Wilson | 47/48.5 |
| 4,381,623 | 5/1983 | Koistinen | 47/48.5 |

*Primary Examiner*—Peter M. Poon
*Assistant Examiner*—Francis T. Palo

*Attorney, Agent, or Firm*—Ronald E. Smith; Smith & Hopen, P.A.

[57]              ABSTRACT

A root feeding stake includes a funnel having a downspout that surmounts a first end of an elongate hollow tube. A second end of the elongate hollow tube is connected to a truncate hollow tube and a second end of the truncate hollow tube is connected to a leading section having a pointed end to facilitate its entry into soil. When installed, the leading section and the truncate hollow tube are below a ground surface and the funnel and elongate hollow tube are above the ground. Perforations are formed in the truncate hollow tube and a barrier is provided between the truncate hollow tube and the leading section so that water and liquid nutrients poured into the funnel flow through the downspout, the elongate hollow tube, and into the ground through the perforations. The perforations are formed in a predetermined sector of the truncate hollow tube to aim the water and liquid nutrients at the roots of a plant near which the stake is positioned.

6 Claims, 3 Drawing Sheets

ROOT FEEDING STAKE

BACKGROUND OF THE INVENTION

1. Field of the Invention

This invention relates, generally, to devices having utility in the art of gardening. More particularly, it relates to a device that positions water and nutrients in optimal relation to the roots of plants, flowers, and the like.

2. Description of the Prior Art

Watering a plant by applying water to a ground surface is wasteful because most of the water applied in that way evaporates before it reaches the roots of the plant.

Soaker hoses that overlie the ground surface and which allow water to seep slowly through the porous walls thereof are more efficient than surface watering because the slow seepage reduces evaporation. However, the water has to travel downwardly into the soil before it reaches the roots so some evaporation still occurs. Moreover, soaker hoses are connected to water faucets and have no convenient means for delivery of liquid nutrients into soil.

What is needed, then, is a more efficient way of delivering water and liquid nutrients to plant roots.

However, in view of the art considered as a whole at the time the present invention was made, it was not obvious to those of ordinary skill in this art how the needed improvements could be provided.

SUMMARY OF THE INVENTION

The long-standing but heretofore unfulfilled need for an apparatus that overcomes the limitations of the prior art is now met by a new, useful, and nonobvious invention. The present invention is a device for delivering water and liquid nutrients to plant roots. It includes a funnel means having a downspout and an elongate hollow tube having a first end and a second end; the first end is adapted to engage the downspout. The inventive structure further includes a truncate hollow tube having a first end and a second end; the first end is adapted to engage the second end of the elongate hollow tube. A leading tube has a first end adapted to engage the second end of the truncate hollow tube and has a second end that is pointed and adapted to penetrate a ground surface. A plurality of perforations are formed in the truncate hollow tube, and a barrier means prevents liquid flow from the second end of the hollow tube into the leading tube so that water and liquid nutrients poured into the funnel flow through the downspout, the elongate hollow tube, and through the perforations formed in the truncate hollow tube so that when the leading tube and the truncate hollow tube are positioned beneath a ground surface, the water and liquid nutrients provide nourishment to a plant near which the device is positioned.

It is a primary object of this invention to advance the gardening arts by providing an apparatus that delivers water and liquid nutrients to the roots of plants with a minimum amount of evaporation.

Another object is to provide an apparatus of elegant construction so that it is economical to manufacture and easy to assemble.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
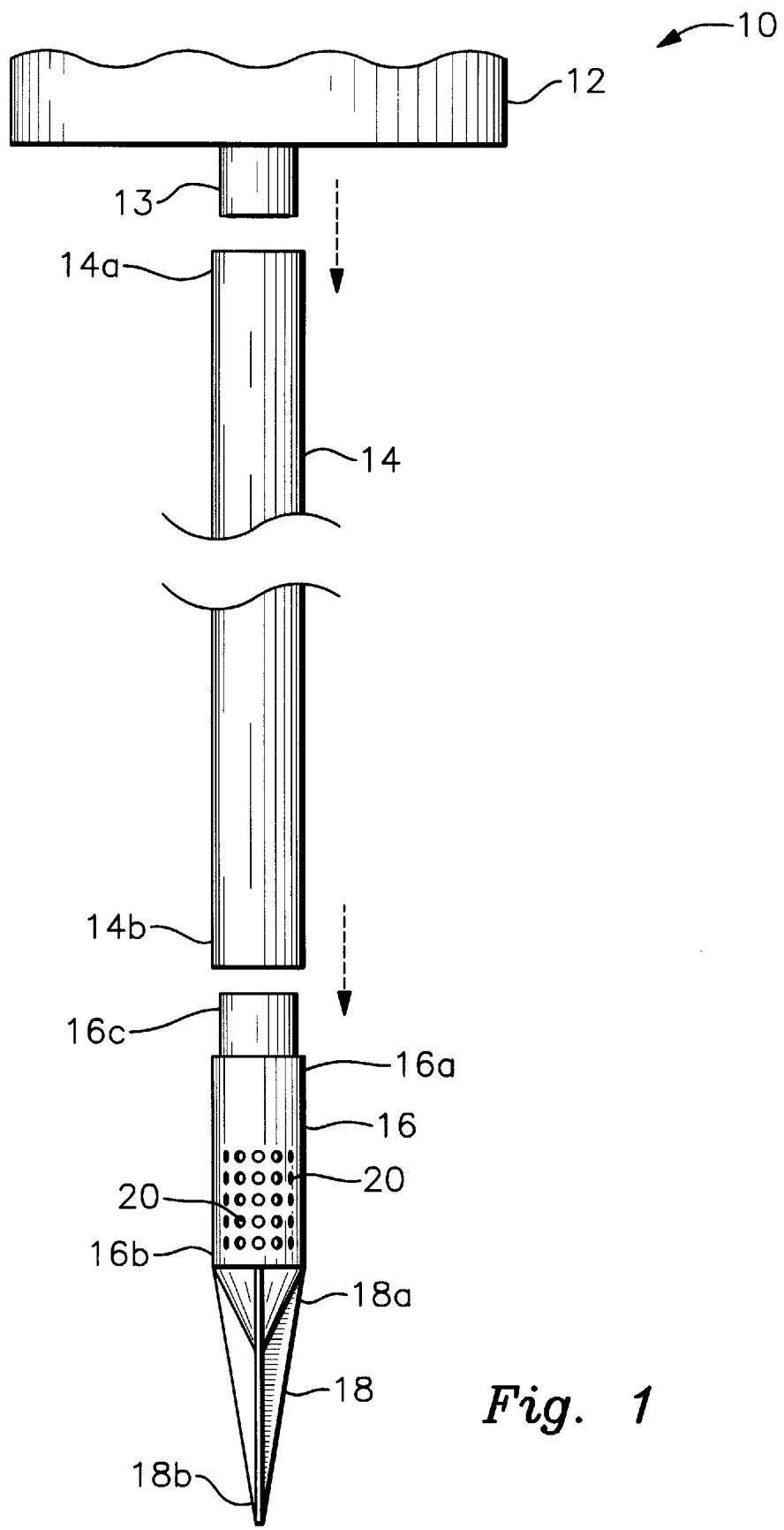
FIG. 1 is an exploded, side elevational view of the novel apparatus.

Referring now to FIG. 1, it will there be seen that an exemplary embodiment of the invention is denoted as a whole by the reference numeral 10.

Root feeding stake 10 includes a funnel means 12 having a downspout 13. It also includes an elongate hollow tube 14 having a first end 14a and a second end 14b, a truncate hollow tube 16 having a first end 16a and a second end 16b, and a leading section 18 having a first end 18a and a second end 18b.

Figure 2:
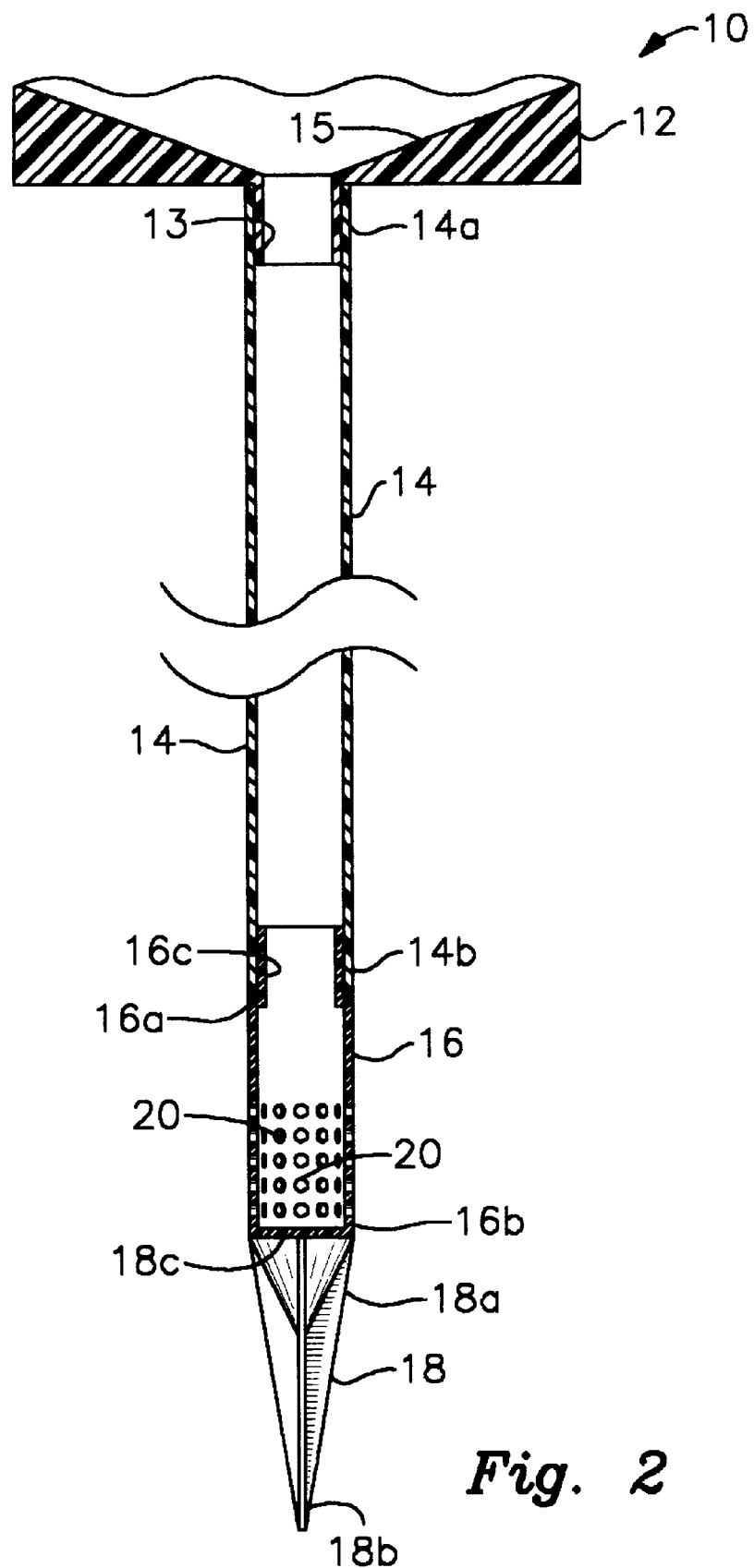
FIG. 2 is a partially sectional view of the novel apparatus when in its assembled configuration.
Figure 3:
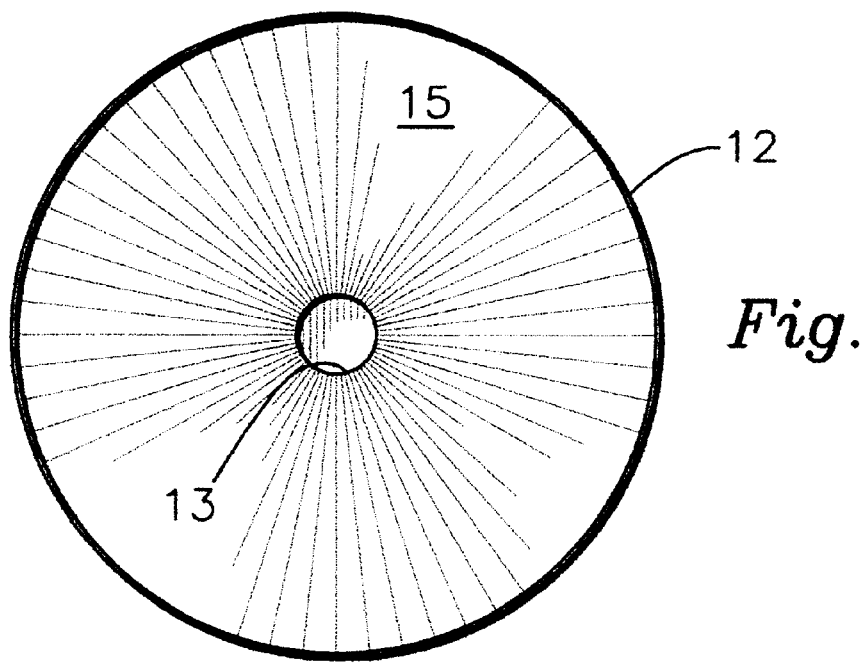
FIG. 3 is a top plan view thereof.

As perhaps best understood in connection with FIGS. 2 and 3, funnel means 12 includes downwardly sloped walls 15 that provide a drainage means into downspout 13. In this way, water or liquid nutrients may be poured into funnel means 12 and delivered to the roots of a plant in the manner described below. Advantageously, funnel means 12 also directs rainwater to said roots.

As best understood in connection with FIG. 2, the external diameter of downspout 13 is slightly smaller than an internal diameter of first end 14a of elongate hollow tube 14 so that said parts are secured to one another by a press fit.

Hollow boss member 16c surmounts first end 16a of truncate hollow tube 16 and is integrally formed therewith or securely joined thereto. Boss member 16c has an external diameter slightly less than the internal diameter of second end 14b of elongate hollow tube 14 and therefore snugly fits into said second end when novel stake 10 is in its assembled configuration.

Boss member 18c similarly surmounts first end 18a of leading hollow tube 18 and is integrally formed therewith or securely joined thereto. Boss member 18c has an external diameter slightly less than the internal diameter of the second end 16b of truncate hollow tube 16 and therefore snugly fits into said second end when stake 10 is in its assembled configuration.

Figure 4:
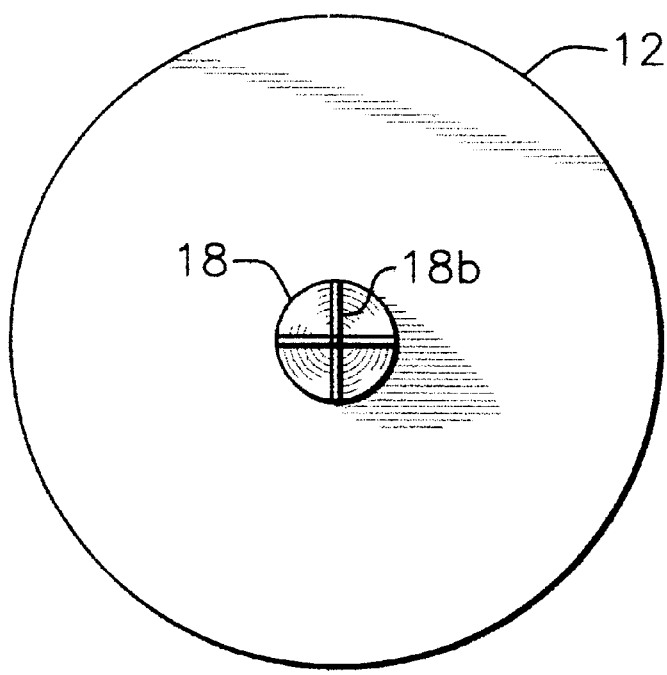
FIG. 4 is a bottom plan view thereof.

Leading section 18 is preferably of arrowhead-like construction, having tapered sidewalls as depicted and having a pointed end denoted 18b (FIGS. 1, 2 and 4). Significantly, boss means 18c is imperforate so that water or liquid nutrients flowing through truncate hollow tube 16 cannot flow through said boss means. However, boss means 18c could be provided in tubular form but in that case, leading section 18 would be of solid construction to prevent liquid flow thereinto. In a preferred embodiment, both boss means 18c and leading section 18 are of solid construction.

Perforations, collectively denoted 20, are formed in truncate hollow tube 16 near its second end 16b. Note that said perforations are formed over a sector of about one hundred eighty degrees, i.e., roughly half of hollow tube 16 is perforated and half is not. This aims the water and nutrients toward the roots of a plant near which stake 10 is positioned, and avoids wasting such water and nutrients by aiming them away from the plant roots.

To use novel root feeding stake 10, leading section 18 is driven into the ground until the uppermost end 16a of truncate hollow tube 16 is substantially flush with ground level. Leading section 18 is about six inches in length and truncate hollow tube 16 is about three inches in length. Thus, perforations 20 are about three inches below ground level when stake 10 is properly installed. This is the ideal depth to supply water and liquid nutrients to plant roots. This depth essentially eliminates evaporation and supplies the water and nutrients at a depth most suitable for optimal plant growth.

Elongate hollow tube 14 is preferably about four feet in length; this makes it easy to pour water or liquid nutrients into funnel means 12.

To prevent unwanted separation of all parts that are press fit together, a suitable adhesive or other bonding means may be employed at all connections.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A device for delivering water and liquid nutrients to plant roots, comprising:

a funnel means having a downspout;

an elongate hollow tube having a first end and a second end, said first end being adapted to engage said downspout;

a truncate hollow tube having a first end and a second end, said first end adapted to engage said second end of said elongate hollow tube;

a leading section having a first end adapted to engage said second end of said truncate hollow tube and having a second end that is pointed and adapted to penetrate a ground surface;

a plurality of perforations formed in said truncate hollow tube; and barrier means for preventing liquid flow from said second end of said hollow tube into said leading section;

whereby water and liquid nutrients poured into said funnel flow through said downspout, said elongate hollow tube, and through said perforations so that when said leading section and said truncate hollow tube are positioned beneath a ground surface, said water and liquid nutrients provide nourishment to a plant near which said device is positioned.

2. The device of claim 1, wherein said first end of said elongate hollow tube has an internal diameter slightly greater than an external diameter of said downspout so that said first end of said elongate hollow tube snugly receives said downspout when said device is in its assembled configuration.

3. The device of claim 1, further comprising a boss means secured to said first end of said truncate hollow tube, said boss means having an external diameter slightly less than an internal diameter of said second end of said elongate hollow tube so that said second end of said elongate hollow tube snugly receives said boss means when said device is in its assembled configuration.

4. The device of claim 1, further comprising a boss means secured to said first end of said leading section, said boss means having an external diameter slightly less than an internal diameter of said second end of said truncate hollow tube so that said second end of said truncate hollow tube snugly receives said boss means when said device is in its assembled configuration.

5. The device of claim 4, wherein said boss means secured to said first end of said leading section is imperforate to provide said barrier means.

6. The device of claim 4, wherein said leading section is solid to provide said barrier means.

\* \* \* \* \*